(12) United States Patent
Cheng et al.

(10) Patent No.: US 8,290,985 B2
(45) Date of Patent: Oct. 16, 2012

(54) ANALYZING PROFILING DATA BASED ON A RATIONAL MODEL

(75) Inventors: Long Cheng, Shanghai (CN); Yi Fei Fang, Shanghai (CN); Liang Qi, Shanghai (CN); Yi Zhen Xu, Shanghai (CN); Pu Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 11/869,959

(22) Filed: Oct. 10, 2007

(65) Prior Publication Data

US 2008/0288529 A1 Nov. 20, 2008

(30) Foreign Application Priority Data

Oct. 10, 2006 (CN) .......................... 2006 1 0142357

(51) Int. Cl.
*G06F 7/00* (2006.01)
*G06F 17/30* (2006.01)

(52) U.S. Cl. ...................................... 707/797
(58) Field of Classification Search ................. 707/797, 707/999.102
See application file for complete search history.

(56) References Cited

U.S. PATENT DOCUMENTS

2003/0105771 A1* 6/2003 Tiefenbrun et al. ....... 707/103 R
2004/0267548 A1* 12/2004 Jones .............................. 705/1

* cited by examiner

*Primary Examiner* — Alexey Shmatov
(74) *Attorney, Agent, or Firm* — Cantor Colburn LLP; Steven Chiu (57) ABSTRACT

Techniques for reconstructing a target hierarchy tree structure from profiling data of a computer system according to a predefined relational model, so as to obtain profiling information of a certain selected node. The predefined relational model is defined in advance according to a hierarchy tree structure of the profiling data, and is stored in an external storage system. The hierarchy tree structures can be constructed dynamically as required, thus the occupied amount of a memory can be seduced and users can view the profiling data freely.

16 Claims, 4 Drawing Sheets

| ENTITY$_1$ (PROCESS) | ENTITY$_2$ (THREAD) | ENTITY$_3$ (MODULE) | ENTITY$_4$ (SYMBOL) | C$_1$ (TICKS) |
|---|---|---|---|---|
| PROCESS1 | THREAD1 | MODULE1 | SYMBOL1 | a |
| PROCESS1 | THREAD1 | MODULE1 | SYMBOL2 | b |
| PROCESS1 | THREAD1 | MODULE2 | ••• | c |
| PROCESS1 | THREAD2 | MODULE2 | SYMBOL1 | d |
| PROCESS1 | THREAD2 | MODULE2 | SYMBOL2 | e |
| ••• | ••• | ••• | ••• | ••• |

ANALYZING PROFILING DATA BASED ON A RATIONAL MODEL

FIELD OF THE INVENTION

The present invention generally relates to the field of performance analysis and optimization of computer systems, and particularly relates to the technical field of analyzing profiling data in computer systems.

BACKGROUND OF THE INVENTION

With the rapid development of information techniques and computer techniques, computer users have higher requirements of the performance of computer systems. Thus, in order to avoid performance bottleneck including hardware bottleneck and software bottleneck in the computer systems, it is required to evaluate and analyze the performance of the computer systems, so as to provide corresponding performance optimization solutions, upgrade hardware and software of the systems and/or improve system architectures, thereby obtaining feasible hardware and software configurations and making utilization of computer resources balanced.

Generally, in order to evaluate the performance of the computer systems, profiling is performed to collect information such as process status in the system and how much CPU resources are used by different processes, modules and threads, respectively. Such information can be collectively referred to as profiling data. After the profiling data is analyzed by users, system administrators or system performance analyzers of the computer systems with existing analysis tools, improvement can be done on some important components of the computer systems, such as sharable runtime libraries, or compilers. Depending on the profiling duration and the number of running processes, threads and so on in the systems, the size of profiling data files obtained from the profiling varies from several megabytes to hundreds megabytes.

Since system performance analysis is often based on aggregate profiling data, the profiling data is required to be read out, calculated, organized, or even transformed. In existing techniques of computer system performance analysis, in order to satisfy the above requirements, traditionally, analysis tools need to pre-read all the contents of the profiling data and then create a target data model in a memory for subsequent analysis as needed.

However, this may cause many problems. For example, since files of the profiling data are required to be transformed into data models for storing into a memory, the occupied amount of the memory will be greatly increased with the increase of the size of the profiling data files. Moreover, for some huge profiling data files, it is impossible to open all these files, read all the contents thereof and then establish target data models in the memory due to the limitation of the memory capacity.

In addition, in most cases, the profiling data files of the computer systems use a hierarchy of Process/Thread/Module to organize the profile data. This hierarchy reflects the structure of the systems in a runtime environment, and is very useful in most cases. However, in addition to the most useful and well-known hierarchy of Process/Thread/Module, in actual system performance analysis procedures, users often need to construct other hierarchy tree structures {which can also be referred to as perspectives} to analyze data from other different views. For example, users may want to view the usage of a certain module in different processes in a hierarchy of "Module/Process". At this time, an additional data model for reorganizing the profiling data after recalculating all the profiling data is required. Therefore, in order to represent a plurality of hierarchy tree structures, it is required to define a plurality of hierarchies and generate different target data models, thus more memory space will be occupied.

Thus, what is needed is a technique by which a predefined relational model can be established based on profiling objects and data type of profiling data in a computer system and the profiling data of the computer system can be reorganized according to different hierarchies based on the predefined relational model to generate different hierarchy tree structures. Users and system performance analyzers could freely view a target hierarchy tree structure as needed and obtain profiling information of corresponding profiling objects in the target hierarchy tree structure.

SUMMARY OF THE INVENTION

In order to provide basic understanding of some aspects of the present invention, a brief summary of the present invention is given herein after. It should be understood that this summary is not an exhaustive generalization of the present invention. It is not intended to determine critical or important parts of the present invention, nor is it intended to define the scope of the present invention. The summary is only used to give some concepts in a simplified form, which will be used as a preliminary description of the more detailed description discussed later.

To solve the above mentioned problems in the prior art, an object of the present invention is to provide a technique for establishing a predefined relational model based on profiling objects and data type of profiling data in a computer system, and reorganizing the profiling data into a target hierarchy tree structure according to different hierarchies based on the predefined relational model.

An other object of the present invention is to provide a method, apparatus and system for dynamically constructing a part of a hierarchy tree structure for profiling data of a computer system according to a predefined relational model, so that users can freely view the whole hierarchy tree structure or a part thereof.

Still another object of the present invention is to provide a computer readable storage medium and computer program product comprising computer program codes for implementing steps of the above method.

In order to achieve the above objects, there is provided, according to an aspect of the present invention, a method for dynamically constructing a target hierarchy tree structure from profiling data of a computer system according to a predefined relational model so as to obtain profiling information of a certain selected node. The predefined relational model is defined according to profiling objects of the profiling data and includes profiling information of each of nodes in the hierarchy tree structure. The method comprises steps of: (a) determining entities at each level in a path from a root node to the selected node in the target hierarchy tree structure according to the predefined relational model and definition of said target hierarchy tree structure, so as to obtain an entity array; (b) obtaining identification information of all the nodes including said selected node in each path from the root node to the selected node in said target hierarchy tree structure according to said entity array, so as to obtain one or more corresponding identification arrays; (c) selecting from said predefined relational model all the rows having corresponding values of said identification array(s) in those columns representing corresponding entities according to said obtained entity array and identification array(s), so as to determine a row set; (d) for all the rows in said row set, grouping together those rows having the same identification information in those columns in said predefined relational model, which represent entities of nodes at the next level to said selected node in said target hierarchy tree structure, according to the entity type of said nodes at the next level, so that the row set is divided into one or more groups; (e) for all the rows of each group in said predefined relational model, aggregating profiling information contained in each row, so as to obtain aggregate profiling information of each group; and (f) processing the obtained aggregate profiling information of each group to obtain the profiling information of said node in said target hierarchy tree structure.

According to another aspect of the present invention, there is also provided an apparatus for reconstructing a target hierarchy tree structure from profiling data of a computer system according to a predefined relational model, so as to obtain profiling information of a certain selected node. The predefined relational model is defined according to a hierarchy tree structure of the profiling data and includes profiling information of each of nodes in the hierarchy tree structure. The apparatus comprises: (a) entity array obtaining means for determining entities at each level in a path from a root node to the selected node in the target hierarchy tree structure according to the predefined relational model and definition of the target hierarchy tree structure, so as to obtain an entity arrays; (b) identification array obtaining means for obtaining identification information of all the nodes including the selected node in each path from the root node to the selected node in the target hierarchy tree structure according to the entity array, so as to obtain one or more corresponding identification arrays; (c) row set determining means for selecting from the predefined relational model all the rows having corresponding values of the identification array(s) in those columns representing corresponding entities according to the obtained entity array and identification array(s), so as to determine a row set; (d) grouping means for grouping together from among all the rows of the row set those rows having the same identification information in those columns in the predefined relational model, which represent entities of nodes at next level to the selected node in the target hierarchy tree structure, according to the entity type of the nodes at the next level, so that the row set is divided into one or more groups; (e) profiling information aggregating means for aggregating profiling information contained in each of all the rows of each group in the predefined relational model, so as to obtain aggregate profiling information of each group; and (f) profiling information obtaining means or processing the obtained aggregate profiling information of each group to obtain the profiling information of the node in the target hierarchy tree structure.

According to still another aspect of the present invention, there is also provided a system for reconstructing a target hierarchy tree structure from profiling data of a computer system according to a predefined relational model so as to obtain profiling information of a certain selected node. The system comprises: relational model establishing means for establishing the predefined relational model according to a hierarchy tree structure of said profiling data; a storage system for storing said predefined relational model; and the apparatus described above for reconstructing the target hierarchy tree structure from the profiling data of the computer system according to the predefined relational model so as to obtain the profiling information of the selected node.

According to other aspects of the present invention, there are also provide a corresponding computer readable storage medium and computer program product.

Using the above mentioned method, apparatus and system of the present invention, a relational model can be established and stored in an external storage system to represent profiling data, and users are allowed to dynamically construct different hierarchy tree structures for the profiling data based on the relational model as required, so that the users are facilitated to view a large amount of profiling data.

The present invention provides the following additional advantage. The relational model can be stored in an external storage system, and due to dynamically constructing a hierarchy tree, stores the whole hierarchy tree inside the computer system can be avoided. Thus, the usage efficiency of the memory can be significantly improved, hardware requirements of analyzing a large amount of profiling data can be greatly reduced, and the capability of profiling a large scale system can be improved.

These and other advantages of the invention will be more apparent from the detailed description of preferred embodiments of the present invention below taken with reference to the accompanying drawings.

BRIEF DESCRIPTION OF THE DRAWINGS

The present invention will be better understood by referring to the following description taken in conjunction with the accompanying drawings, in which the same or similar reference signs are used to denote the same or similar elements throughout the drawings. The drawings together with the following detailed description are incorporated into the specification and formed as a part thereof, and are used to further illustrate preferred embodiments of the present invention and explain principles and advantages of the present invention.

Those skilled in the art will appreciate that, elements or units in the drawings are illustrated only for simplicity and clarity and have not necessarily been drawn to scale. For example, the dimensions of some of the elements in the drawings may be enlarged relative to other elements to help to improve understanding of the embodiments of the present invention.

DETAILED DESCRIPTION OF THE PREFERRED EMBODIMENTS

Exemplary embodiments of the present invention will be described in conjunction with the accompanying drawings hereinafter. For the sake of clarity and conciseness, not all the features of actual implementations are described in the specification. However, it is to be appreciated that, during developing any of such actual implementations, numerous implementation-specific decisions must be made to achieve the developer's specific goals, for example, compliance with system-related and business-related constraints which will vary from one implementation to another. Moreover, it is also to be appreciated that, such a development effort might be complex and time-consuming, but may nevertheless be a routine task for those skilled in the art having the benefit of this disclosure.

Furthermore, it is noted herein that, in order to avoid obscuring the present invention due to unnecessary details, the drawings only shoe device structures and/or processing steps closely related to the solutions according to the present invention and other details little related to the present invention are omitted.

Generally, profiling data is generated as a plurality of raw trace events. A file containing these raw trace events is usually called a "trace file". An other way to represent the trace events is to reorganize the raw trace events into a static hierarchy tree structure which represents a snapshot of a profiled system. Therefore, no matter how to generate the profiling data and no matter what is the file format of the generated profiling data, the profiling data can be represented in a hierarchy tree structure which exactly represents the snapshot of the profiled system.

Figure 1:
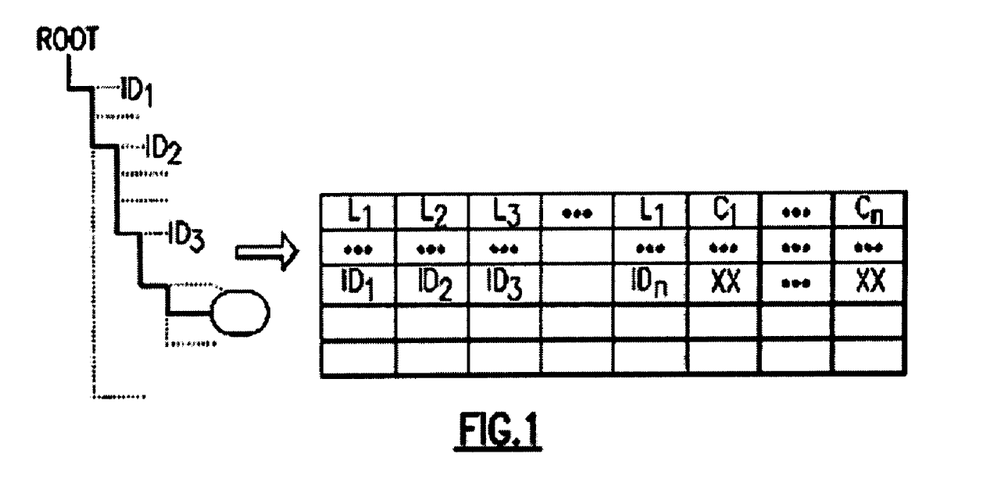
FIG. 1 illustrates the mapping relationship between a hierarchy tree structure and a relational Model (which can also be referred to as a hierarchy table) of profiling data according to one embodiment of the present invention.

FIG. 1 illustrates the mapping relationship between the profiling data and a relational model (which can also be referred to as a hierarchy table) according to one embodiment of the present invention.

Assume that the profiled system contains n levels of profiling objects (which can also be referred to as entities being profiled), which are denoted as $Level_1$, $Level_2$, ..., and $Level_n$, respectively, or which can also be referred to as $Entity_1$, $Entity_2$, ..., and $Entity_n$, respectively, for the sake of simplicity. The generated profiling data of this system is organized according to a certain kind of hierarchy relationship, for example, the hierarchy relationship of the profiling objects at runtime. The hierarchy tree structure of the profiling data is shown in the left part of FIG. 1, wherein $ID_1$, $ID_2$, ..., and $ID_n$ represent identification information of nodes at each level, for example, $ID_2$ represents identification information of a node at the $2^{nd}$ level.

In order to map the above hierarchy tree structure into a relational model, as shown in the right part of FIG. 1, every full path from a Root node to every leaf node in the tree structure is stored as one row in the relational model, and each column in the relational model is populated with the identification information of the node belonging to the level which corresponds to this column, thereby constructing the first n columns in the relational model, that is, columns $L_1$, $L_2$, ..., and $L_n$.

In addition, in the relational model, as shown in the right part of FIG. 1, besides information of each path in the hierarchy tree structure, various profiling information, for example, different values of CPU performance counters, can be stored in respective columns after the $n^{th}$ column in the relational model as required, so that columns $C_1$, $C_2$, ..., and $C_n$ in the relational model age constituted.

An example of the profiling data will be explained hereinafter.

Figure 2:
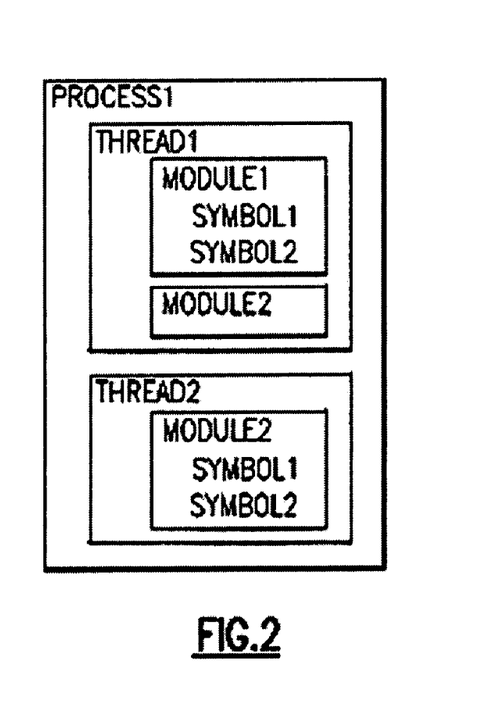
FIG. 2 illustrates an example of profiling data which is organized according to a hierarchy of profiling objects under a runtime environment.

For the sake of simplicity, assume that an example of the profiling data is shown in FIG. 2. As shown in FIG. 2, this profiling data is organized in a hierarchy of "Process/Thread/Module", which is the sane as that in a runtime environment.

In the example as shown in FIG. 2, a plurality of processes can run simultaneously in a computer system, one or more threads may be involved under each process, one or more modules may be involved under each thread, and one or more symbols may further be involved under each module. In addition, each level in the hierarchy contains a count value obtained by a performance counter, for example, a Ticks value which represents the processor time used in the computer system herein. In this hierarchy example, Process, Thread and Module are all the entities (or objects) that can be profiled. These entities can also be called as $Entity_1$, $Entity_2$, ..., and $Entity_n$, and they contain at least profiling information $C_1$ such as Ticks and have a hierarchy relationship with each other.

Figure 3:
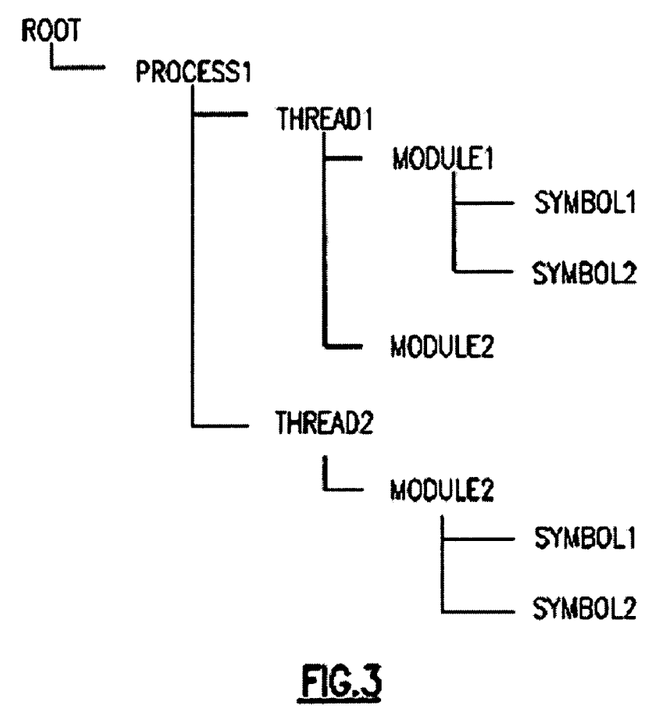
FIG. 3 illustrates a hierarchy tree structure corresponding to the profiling data example shown in FIG. 2.

A hierarchy tree structure corresponding to the profiling data example shown in FIG. 2 is illustrated in FIG. 3, in which Process, Thread, and Module correspond to $Level_1$, $Level_2$, ..., $Level_n$ in the profiling data tree structure shown in FIG. 1, respectively.

It is noted that, for the sake of simplicity, only four profiling objects, i.e., Process, Thread, Module, and Symbol are shown in FIG. 2; however, it is obvious that there may be more or less profiling objects as required.

Figure 4:
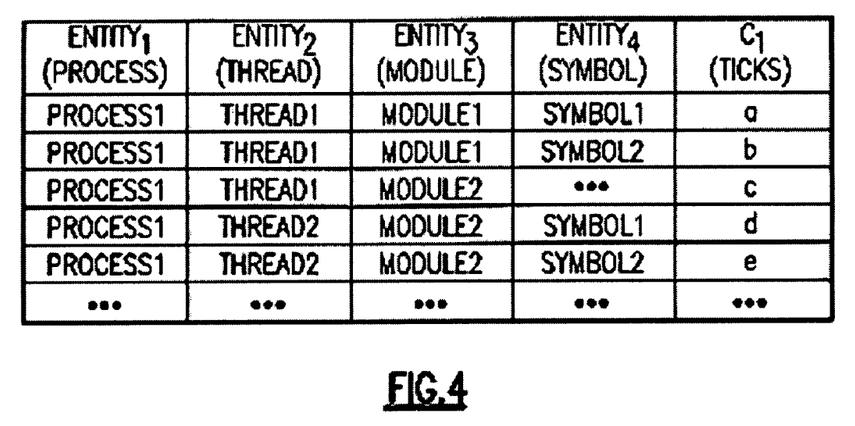
FIG. 4 illustrates a relational model obtained by mapping (or transforming) the profiling data shown in FIG. 2.

According to the mapping relationship between the profiling data and the relational model illustrated in FIG. 1, the profiling data shown in FIG. 2 can be mapped (or transformed) into the relational model illustrated in FIG. 4, which can be expressed in a relational algebra language R (PROCESS, THREAD, MODULE, SYMBOL, TICKS).

Figure 5:
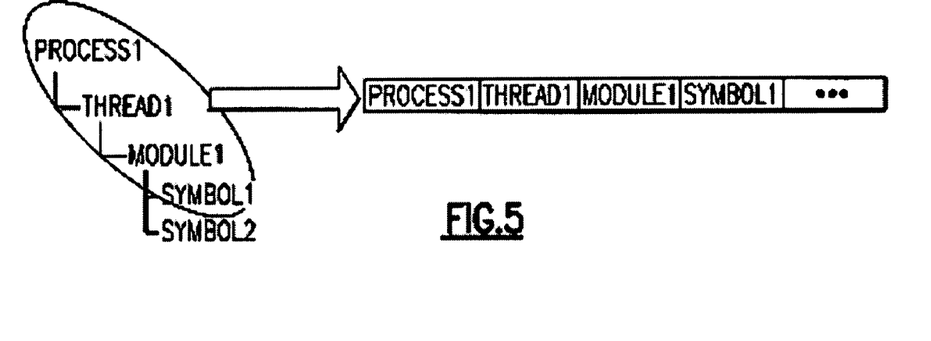
FIG. 5 illustrates the mapping relationship between one path in the hierarchy tree structure of the profiling data as shown in FIG. 3 and one row in the relational model as shown in FIG. 4.

Each row in the relational model represents one path from the root node to a leaf node in the hierarchy tree structure of the profiling data. For example, FIG. 5 illustrates the mapping relationship between the first row in the relational model and the path Process1/Thread1/Module1/Symbol1 in the hierarchy tree structure shown in FIG. 3.

In order to reduce the occupied amount of the memory in the computer system, the above relational model can be stored in an external storage system outside the computer system. This external storage system has usually established indexes on columns, and provided relational operations such as grouping selection, projection, aggregation, etc. The external storage system can be implemented in various ways. A relational database is the most convenient one. It is apparent that other storage systems provided with indexes are also feasible. For example, a file-based data storage system provided with indexes is also such an example.

In practical applications, users or system performance analyzers might and often need to construct a tree structure different from the hierarchy tree structure illustrated in FIG. 3, that is, they need to dynamically construct a hierarchy tree structure of the profiling data. For example, regarding the profiling data illustrated in FIG. 2, it may be desired to obtain profiling information of each module in each of or all the processes currently running in the computer system, or profiling information of each thread in each of or all the processes currently running. At this time, different hierarchies can be defined, different hierarchy tree structures can be constructed based on the above defined relational model, and profiling information such as a Ticks value of each node in the different hierarchy tree structures can be calculated.

Figure 6:
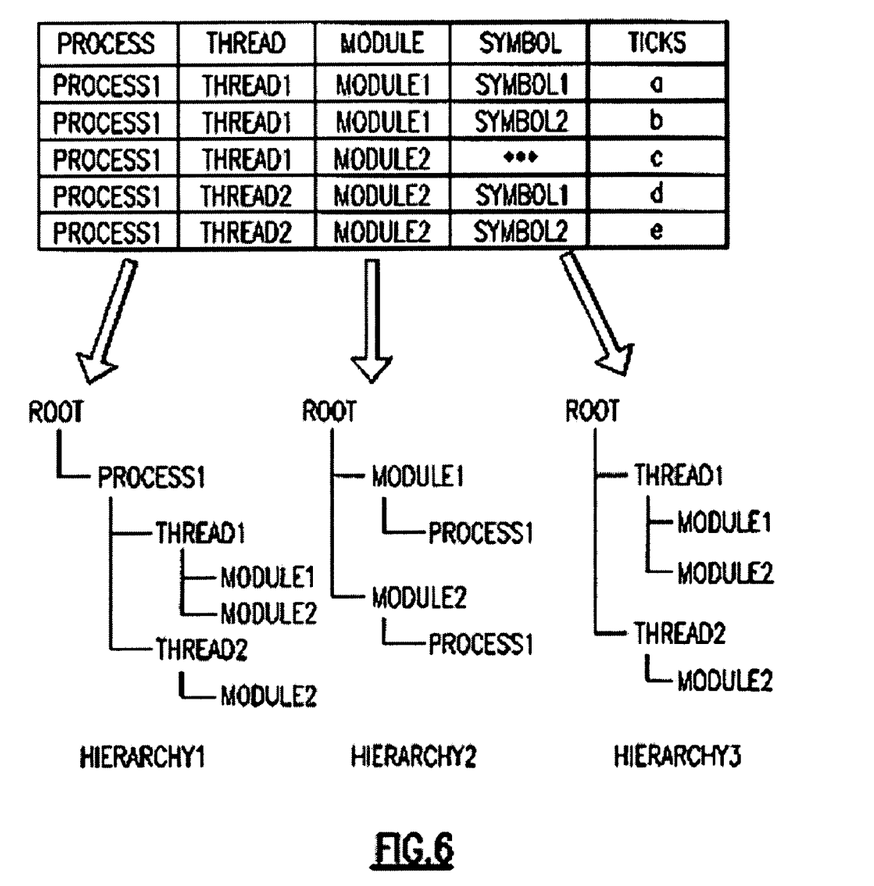
FIG. 6 illustrates the three different hierarchy trees generated from the relational model shown in FIG. 4 according to three hierarchies defined by this model.

For example, as illustrated in FIG. 6, for the profiling data example shown in FIG. 2, users or system performance analyzers can define the following three hierarchies to analyze data obtained by performing profiling as required: "Process/Thread/Module", "Module/Process", and "Thread/Module". Of course, other hierarchies can also be defined.

The processing flow of a method for constructing a now hierarchy tree structure (i.e., target tree structure) according to an embodiment of present invention will be described below.

Herein, assume that a new hierarchy tree structure desired to be constructed by users is expressed as a vector D: ($L_{p1}$, $L_{p2}$, ..., $L_{pn}$), in which (p1, p2, ..., pn) is a permutation of n-level profiling objects from level 1 to level n.

Figure 7:
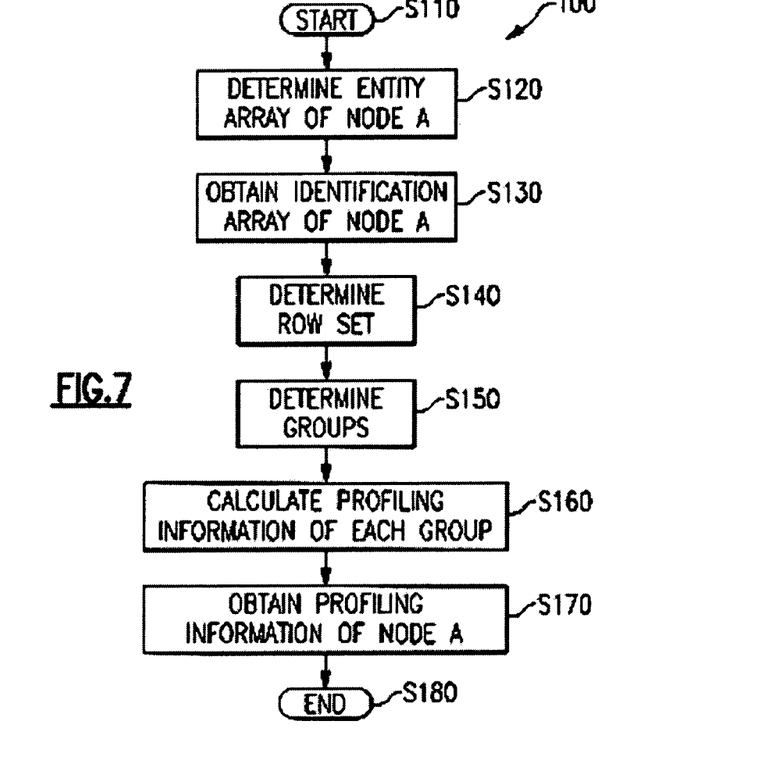
FIG. 7 is a flowchart showing the process of a method for dynamically constructing child nodes of a selected node A at the $r^{th}$ level of a new hierarchy tree structure (i.e., target hierarchy tree structure) based on a predefined relational model and obtaining profiling information thereof.

The flowchart of FIG. 7 shows the process of a method 100 for dynamically constructing child nodes of a selected node A at the $r^{th}$ level of a new hierarchy tree structure (i.e., target tree structure) and obtaining profiling information thereof based on a predefined relational model according to one embodiment of present invention.

The method 100 begins with step S110. Then, at step S120, for the selected node A at the $r^{th}$ level, the entity type of nodes at each level from the root node to the selected node A (that is, nodes at each level from the node at the first level to the node at the $r^{th}$ level) is determined so that an entity array ($L_{p1}$, $L_{p2}$, ..., $L_{pr}$) can be obtained.

For example, taking three hierarchies as shown in the lower part of FIG. 6 as examples, for a certain node Module1 at Module level, the entity arrays thereof are (Process, Thread, Nodule), (Module), and (Thread, Module), respectively. It is obvious that other hierarchy tree structures can be defined as required, so that different entity arrays can be determined.

Then, at step S130, according to the obtained entity array, corresponding identification information corresponding to the entity array in the target tree structure is obtained, that is, the identification information of all the nodes (including the selected node A) in all the paths from the root node to the selected node A in said target tree structure is obtained, so that an identification array ($ID_{p1}$, $ID_{p2}$, ..., $ID_{pr}$) can be obtained. The node A can be uniquely determined by this identification array and the entity array obtained above.

For instance, still taking the three hierarchies of Hierarchy 1, Hierarchy 2, and Hierarchy 3 shown in the lower part of FIG. 6 as examples, for the selected node Module1, the obtained identification arrays are as follows: (1) (Process1, Thread1, Module1); (2) (Module1); and (3) (Thread1, Module1), respectively. However, for another node Module2, the obtained identification arrays are as follows: (1) (Process1, Thread1, Module2) or (Process1, Thread2, Module2) depending on which Module2 is selected by users; (2) (Module2); and (3) (Thread1, Module2) or (Thread2, Module2) depending on which Module2 is selected by users.

At step S140, all the rows satisfying the follow constraints are selected from the predefined relational model (that is, hierarchy table), and the selected rows are marked as a row set S. The constraints are as follows:

$$V(L_{p1})=ID_{p1}, V(L_{p2})=ID_{p2}, \ldots, \text{ and } V(L_{pr})=ID_{pr},$$

where $V(L_i)$ denotes an ID value in the column representing $L_i$ in the predefined relational model.

That is at this step, all the rows having corresponding values of the above identification array in the columns representing corresponding entities are selected from the predefined relational model (for example, the relational model illustrated in FIG. 4) according to the obtained entity array and identification array, so that the row set S can be determined.

Next, at step S150, those rows having the same identification at the $L_{p(r+1)}^{th}$ level of the target hierarchy tree structure are grouped together within the obtained row set S, so that the row set S can be divided into one or more groups which can be expressed as ($G_1$, $G_2$ ..., $G_0$). It should be noted that, the number of the groups is the same as that of the child nodes of the node A in the target hierarchy tree structure.

After that, at step S160, for each group determined at step S150, profiling information such as the Ticks value in each row in this group are summed up, so as to calculate the profiling information (which can also be referred to as aggregate information) of each group. The aggregate information obtained after the calculation is the profiling information of each child node of the selected node A in the desired target tree structure.

Then, the processing flow of the method 100 proceeds to step S170, where the aggregate profiling information of each group is added together to obtain aggregate profiling information of the node A.

Then, the method ends at step s180.

By perform iteration from the root node of the target hierarchy tree structure using the method 100, corresponding tree nodes can be constructed according to arbitrary hierarchy tree structure definitions, thus the desired target hierarchy tree can be constructed.

The processing flow of the method 100 will be further described below in detail by means of a specific example.

For example, assume that the predefined relational model is illustrated in FIG. 4, and that users or system performance analyzers want to know (or obtain) the value of the processor time (i.e., Ticks value) used by Module2 in Process1 (including all threads in Process1) in the current computer system.

Figure 8:
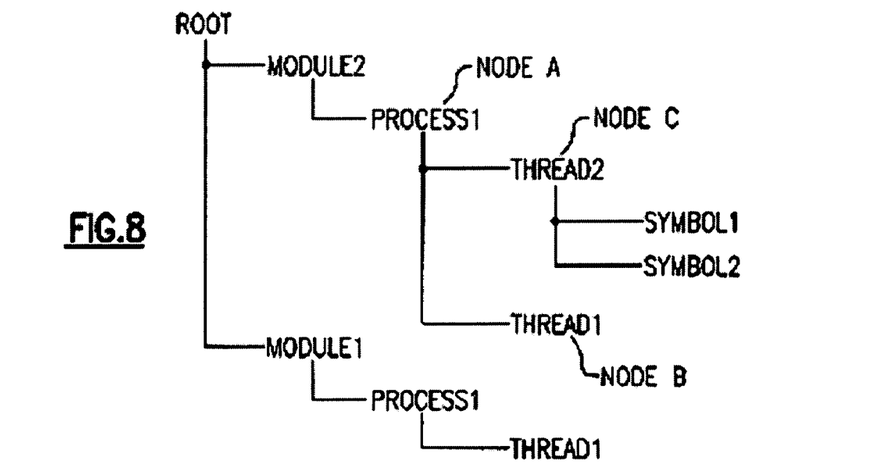
FIG. 8 illustrates a target hierarchy tree structure obtained from the profiling data example shown in FIG. 2.

At this time, it can be determined that the hierarchy that the users or system performance analyzers want to obtain is "Module/Process/Thread", that is, the desired target tree structure is as shown in FIG. 8, and a selected node A is as shown in this figure.

According to the process of the method as shown in FIG. 7, for the selected node A, a path from the root node to the selected node A is determined according to the tree structure shown in FIG. 8, so that an entity array of the node A is obtained as (Module, Process), and its corresponding identification array is (Module2, Process1).

Then, all the rows having corresponding values of the identification array in the columns corresponding to the entity array are selected from the predefined relational model (as shown in FIG. 4), that is, all the rows satisfying the following constrains are selected: ID=Process1 in column $Entity_1$ (i.e., column Process), and ID=Module2 in column $Entity_3$ (i.e., column Module). Specifically, the $3^{rd}$, $4^{th}$, and $5^{th}$ rows in the relational model shown in FIG. 4 are selected to construct a row set S.

For all the rows in the row set S, the next level to the node A is Thread level in the target tree structure illustrated in FIG. 8, therefore, one or more rows having the same ID value in column Thread are grouped together according to the ID values in column Thread in the relational model as illustrated in FIG. 4. Specifically, the $3^{rd}$ row in the relational model illustrated in FIG. 4 is determined as the first group ($G_1$) which has an ID value of Thread1 in column Thread, and the $4^{th}$ and $5^{th}$ rows in the relational model are determined as the second group ($G_2$) which has an ID value of Thread2 in column Thread.

After that, for all the rows in each group determined above, the values in column $C_1$ (i.e. column Ticks) in the relational model illustrated in FIG. 4 are summed up, so as to calculate corresponding aggregate information of each group. That is, for group G1, the Ticks value "c" obtained after the calculation is the Ticks value of a node B in the tree structure illustrated in FIG. 8, which represents the processor time used by Module2 in Process1 and Thread1 in the current computer system. Whereas, for group $G_2$, the value "d+e" obtained by summing up the Ticks values in the 4$^{th}$ and 5$^{th}$ rows in the relational model illustrated in FIG. 4 is the Ticks value of a node C in the tree structure illustrated in FIG. 8, which represents the processor time used by Module2 in Process1 and Thread2 in the current computer system.

Then, the calculated Ticks values of the above two groups, that is, the Ticks values of the nodes D and C are summed up to obtain the Ticks value of the node A, that is, "c+d+e", which represents the processor time used by Module2 in Process1 in the current computer system.

It can be seen from the above described example that, using the method 100 illustrated in FIG. 7, it is not required to construct the whole target tree structure. No matter when users want to view which of the nodes in the target tree structure, any parts of the tree structure and corresponding tree nodes thereof, which are wanted to be viewed by users, can be constructed by using the predefined relational model stored in an external storage system, that is, the desired parts of the hierarchy tree structure can be dynamically constructed as required, so that users can freely view the profiling data. In addition, it is not necessary to store all the profiling data and data models of a plurality of tree structures in the memory of the computer system and calculate the same just like in the prior art, thus the occupied amount of the memory can be significantly reduced and the time for rendering the tree structure can be shortened. Therefore, theoretically, the occupied amount of the memory can be hold at a relatively fixed value irrespective of the size of original profiling data file.

It should be noted that, in the embodiment discussed above in connection with FIGS. 2-8, for the sake of simplicity and clarity, description is given by taking the profiling data illustrated in FIG. 2 as an example, only four profiling objects, that is, Process, Thread, Module, and Symbol of the profiling data are described, and only Ticks is described as an example of profiling information contained in nodes at each level of the hierarchy tree structure. However, it should be appreciated that, depending on real applications, the profiling data can have profiling objects of different types, different relational models, different hierarchies and different profiling information, and different target hierarchy tree structures can be constructed as required, so that the profiling information of different nodes in different target hierarchy tree structures can be obtained. Therefore, the method according to the embodiment of present invention can provide users (or system performance analyzers) with the capability of freely viewing the profiling data by dynamically constructing the hierarchy tree structure.

According to other embodiments of the present invention, there are also provided an apparatus and system for implementing the processing steps of the method described with reference to FIG. 7.

Herein, for the sake of conciseness, the apparatus and system have not been described in detail with reference to the drawings, but only the literal description thereof is given below. However, it is apparent that those skilled in the art can easily draw a corresponding structural block diagram based on the following description.

According to the present invention, there is provided an apparatus for reconstructing a target hierarchy tree structure from profiling data of a computer system according to a predefined relational model so as to obtain profiling information of a certain selected node, wherein said predefined relational model is defined according to a hierarchy tree structure of said profiling data and includes profiling information of each of nodes in this hierarchy tree structure. Said apparatus comprises: (a) entity array obtaining means for determining entities at each level in a path from the root node to said selected node in said target hierarchy tree structure according to said predefined relational model and definition of said target hierarchy tree structure so as to obtain an entity array; (b) identification array obtaining means for obtaining identification information of all the nodes including said selected node in each path from the root node to the selected node in said target hierarchy tree structure according to said entity array, so as to obtain one or more corresponding identification arrays; (c) row set determining means for selecting from said predefined relational model all the rows having corresponding values of said identification array(s) in those columns representing corresponding entities according to said obtained entity array and identification arrays so as to determine a row set; (d) grouping means for grouping, from among all the rows of said row set, those rows having the same identification information in those columns in said predefined relational model, which represent entities of nodes at the next level to said selected node in the target hierarchy tree structure, according to the entity type of said nodes at the next level, so that said row set is divided into one or more groups; (e) profiling information aggregating means for aggregating profiling information contained in each of all the rows in each group in said predefined relational model, so as to obtain aggregate profiling information of each group; and (f) profiling information obtaining means for processing the obtained aggregate profiling information of each group to obtain the profiling information of said node in said target hierarchy tree structure.

In said apparatus, one path from the root node to each leaf node in the hierarchy tree structure of the profiling data can be represented as one row in said predefined relational model, and each row in said predefined relational model further comprises profiling information of the corresponding leaf node in the hierarchy tree structure of said profiling data.

Wherein, said profiling information contains at least used processor time information in the computer system.

In said apparatus, the profiling information aggregating means sums up the used processor time contained in each row of every determined group in said predefined relational model, so that a total used processor time of each group can be obtained.

In said apparatus, by performing iteration of all the nodes beginning with the root node in said target hierarchy tree structure, the profiling information of all the nodes in said target hierarchy tree structure can be obtained.

Wherein, said predefined relational model can be read out from a relational database. Alternatively, said predefined relational model can be read out from an external storage system outside the computer system. Furthermore, alternatively, said predefined relational model can be read out from any storage system that can implement a relational model.

Furthermore, according to the embodiments of the present invention, there is also provided a system for reconstructing a target hierarchy tree structure from profiling data of a computer system according to a predefined relational model so as to obtain profiling information of a certain selected node. Said system comprises: relational model establishing means for establishing a predefined relational model according to a hierarchy tree structure of said profiling data; a storage system for storing said predefined relational model; and the apparatus described above for reconstructing the target hierarchy tree structure from the profiling data of the computer system according to the predefined relational model so as to obtain the profiling information of the selected node.

In said system, one path from a root node to each leaf node in said hierarchy tree structure of the profiling data can be represented as one row in said predefined relational model, and each row further comprises profiling information of the corresponding leaf node.

In said system said profiling information contains at least used processor time information in the computer system.

The apparatus and system according to the embodiments of present invention can also provide users or system administrators with the capability of freely viewing the profiling data by dynamically constructing a hierarchy tree structure, so that the capability of profiling and analyzing a large scale system can be greatly improved.

Furthermore, it is obvious that the operation procedure of the method according to the present invention described above can also be implemented in the form of a computer executable program stored in various machine readable storage media.

Moreover, the objects of the present invention can also be implemented by providing a storage medium with codes of the above executable program stored thereon directly or indirectly to a system or device, and then reading out and executing the program codes by a computer or center processing unit (CPU) of the system or device.

At this time, as long as the system or device has a function of executing a program, implementing modes of the present invention are not limited to the program, and the program can be in any form of, for example, an object program, program executed by an interpreter, or script program provided to an operating system, etc.

The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a client computer by connecting to corresponding websites on the Internet, downloading the computer program codes according to the present invention and installing the same into the computer and then executing the program codes.

Finally, it is also noted that, in this document, relational terms such as left and right, first and second, and the like are used merely to distinguish one entity or action from another entity or action without necessarily requiring or implying any actual such relationship or order between such entities or actions. Moreover, the terms "comprise", "comprising", "include" or any other variations thereof, are intended to cover a non-exclusive inclusion so that a process, method, article, or device that comprises a list of elements does not only include these elements but also may include other elements not explicitly listed or inherent to such process, method, article, or device. An element preceded by "a" or "an" does not, without more constraints, preclude the existence of additional identical elements in the process, method, article, or device that comprises the element.

Although the embodiments of the present invention have been described in detail with reference to the accompanying drawings, it should be noted that, these embodiments are only used to illustrate the present invention but not to limit the present invention various modifications and changes can be made by those skilled in the art without departing from the spirit and scope of the present invention. Therefore, the scope of the present invention is only defined by the appended claims and the equivalents thereof.

What is claimed is:

1. A method for dynamically constructing a target hierarchy tree structure from profiling data of a computer system according to a predefined relational model so as to obtain profiling information of a certain selected node, wherein said predefined relational model is defined according to profiling objects of said profiling data and includes profiling information of each of nodes in the hierarchy tree structure, said method comprising steps of:
    (a) determining entities at each level in a path from a root node to said selected node in said target hierarchy tree structure according to said predefined relational model and definition of said target hierarchy tree structure, so as to obtain an entity array, said entity array comprising the values of each node between said root node and said selected node, including said selected node;
    (b) obtaining identification information of all the nodes including said selected node in each path from the root node to the selected node in said target hierarchy tree structure according to said entity array, so as to obtain one or more corresponding identification arrays, wherein each of said one or more identification arrays uniquely identifies each path from said root node to said selected node;
    (c) selecting from said predefined relational model all the rows having corresponding values of said identification array(s) in those columns representing corresponding entities according to said obtained entity array and identification array(s), so as to determine a row set;
    (d) for all the rows of said row set, grouping together those rows having the same identification information in those columns in said predefined relational model, which represent entities of nodes at the next level to said selected node in said target hierarchy tree structure, according to the entity type of said nodes at the next level, so that said row set is divided into one or more groups;
    (e) for all the rows of each of said groups in said predefined relational model, aggregating profiling information contained in each row, so as to obtain aggregate profiling information of each group; and
    (f) processing the obtained aggregate profiling information of each group to obtain the profiling information of said node in said target hierarchy tree structure, said hierarchy tree structure comprising only said nodes between said root node and said selected node, and leaf nodes of said selected node.

2. The method of claim 1, wherein one path from the root node to each leaf node in the hierarchy tree structure of the profiling data is represented as one row in said predefined relational model, and each row in said predefined relational model further comprises profiling information of the corresponding leaf node in the hierarchy tree structure of said profiling data.

3. The method of claim 2, wherein said profiling information contains at least used processor time information in the computer system.

4. The method of claim 3, wherein said step (e) further comprises a step of summing up the used processor time contained in each row of each determined group in said predefined relational model so that a total used processor time of each group is obtained.

5. The method of claim 1, further comprising a step of:
    repeatedly performing steps (a)-(f) for all the nodes beginning with the root node in said target hierarchy tree structure, so that the profiling information of all the nodes in said target hierarchy tree structure can be obtained.

6. The method of claim 1, wherein said predefined relational model is stored in any storage system which can implement a relational model.

7. The method of claim 1, wherein said predefined relational model is stored in a relational database.

8. The method of claim 1, therein said predefined relational model is stored in an external storage system outside the computer system.

9. A computer program product for dynamically constructing a target hierarchy tree structure from profiling data of a computer system according to a predefined relational model so as to obtain profiling information of a certain selected node, wherein said predefined relational model is defined according to profiling objects of said profiling data and includes profiling information of each of nodes in the hierarchy tree structure, the computer program product comprising:
- a non-transitory storage medium readable by a processing circuit and storing instructions for execution by the processing circuit for performing a method, said method comprising of:
- (a) determining entities at each level in a path from a root node to said selected node in said target hierarchy tree structure according to said predefined relational model and definition of said target hierarchy tree structure, so as to obtain an entity array, said entity array comprising the values of each node between said root node and said selected node, including said selected node;
- (b) obtaining identification information of all the nodes including said selected node in each path from the root node to the selected node in said target hierarchy tree structure according to said entity array, so as to obtain one or more corresponding identification arrays, wherein each of said one or more identification arrays uniquely identifies each path from said root node to said selected node;
- (c) selecting from said predefined relational model all the rows having corresponding values of said identification array(s) in those columns representing corresponding entities according to said obtained entity array and identification array(s), so as to determine a row set;
- (d) for all the rows of said row set, grouping together those rows having the same identification information in those columns in said predefined relational model, which represent entities of nodes at the next level to avid selected node in said target hierarchy tree structure, according to the entity type of said nodes at the next level, so that said row set is divided into one or more groups;
- (e) for all the rows of each of said groups in said predefined relational model, aggregating profiling information contained in each row, so as to obtain aggregate profiling information of each group; and
- (f) processing the obtained aggregate profiling information of each group to obtain the profiling information of said node in said target hierarchy tree structure, said hierarchy tree structure comprising only said nodes between said root node and said selected node, and leaf nodes of said selected node.

10. The method of claim 9, wherein one path from the root node to each leaf node in the hierarchy tree structure of the profiling data is represented as one row in said predefined relational model, and each row in said predefined relational model further comprises profiling information of the corresponding leaf node in the hierarchy tree structure of said profiling data.

11. The method of claim 10, wherein said profiling information contains at least used processor time information in the computer system.

12. The computer program product of claim 11, wherein said step (e) further comprises a step of summing up the used processor time contained in each row of each determined group in said predefined relational model so that a total used processor time of each group is obtained.

13. The computer program product of claim 9, further comprising a step of:
- repeatedly performing steps (a)-(f) for all the nodes beginning with the root node in said target hierarchy tree structure, so that the profiling information of all the nodes in said target hierarchy tree structure can be obtained.

14. The computer program product of claim 9, wherein said predefined relational model is stored in any storage system which can implement a relational model.

15. The computer program product of claim 9, wherein said predefined relational model is stored in a relational database.

16. The computer program product of claim 9, therein said predefined relational model is stored in an external storage system outside the computer system.

* * * * *